(12) United States Patent
Matsubayashi et al.

(10) Patent No.: US 10,222,007 B2
(45) Date of Patent: Mar. 5, 2019

(54) LIGHTING APPARATUS WITH LOWER COLOR TEMPERATURE LIGHTING TO A PERIPHERAL REGION

(71) Applicant: PANASONIC INTELLECTUAL PROPERTY MANAGEMENT CO., LTD., Osaka (JP)

(72) Inventors: Yoko Matsubayashi, Osaka (JP); Tohru Himeno, Osaka (JP); Hiroko Koiwa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 96 days.

(21) Appl. No.: 15/447,706

(22) Filed: Mar. 2, 2017

(65) Prior Publication Data

US 2017/0254487 A1   Sep. 7, 2017

(30) Foreign Application Priority Data

Mar. 3, 2016   (JP) .................. 2016-041444

(51) Int. Cl.

| F21K 9/61 | (2016.01) |
| F21V 3/06 | (2018.01) |
| F21V 3/00 | (2015.01) |
| F21V 19/00 | (2006.01) |
| F21V 23/00 | (2015.01) |
| F21V 8/00 | (2006.01) |

(Continued)

(52) U.S. Cl.
CPC .................. *F21K 9/61* (2016.08); *F21S 8/04* (2013.01); *F21V 3/00* (2013.01); *F21V 3/0625* (2018.02);

(Continued)

(58) Field of Classification Search
CPC ... F21S 8/026; F21S 8/04; F21S 8/046; F21V 21/40–21/406; F21V 21/26–21/30;

(Continued)

(56) References Cited

U.S. PATENT DOCUMENTS 9,084,305 B2   7/2015   Toda et al.
9,163,790 B2   10/2015   Ogata et al.
(Continued)

FOREIGN PATENT DOCUMENTS

JP   04-032101   2/1992
JP   04-137305   5/1992
(Continued)

OTHER PUBLICATIONS

Machine translation of JP 2014/075186, retrieved on Jul. 25, 2018.*
(Continued)

*Primary Examiner* — Anh T Mai
*Assistant Examiner* — Steven Y Horikoshi
(74) *Attorney, Agent, or Firm* — Greenblum & Bernstein, P.L.C.

(57) ABSTRACT

A lighting apparatus is provided. The lighting apparatus includes a first light distributor which illuminates a predetermined region, and a second light distributor which illuminates a periphery of the predetermined region. The first light distributor includes a first light emitting element having a spectral emission characteristic defined by a correlated color temperature of light being at least 5400 K and at most 7000 K, Duv being in a range of −6 to 5 inclusive, a chroma value calculated using a calculation method specified by the CIE 1997 Interim Color Appearance Model (Simple Version) being 2.7 or less, and a general color rendering index Ra being 80 or more. The second light distributor includes a second light emitting element having a spectral emission characteristic defined by a correlated color temperature of light being lower than the correlated color temperature of the light emitted by the first light emitting element.

18 Claims, 11 Drawing Sheets

(51) Int. Cl.
*F21S 8/04* (2006.01)
*F21Y 105/12* (2016.01)
*F21Y 105/18* (2016.01)
*F21Y 113/13* (2016.01)
*F21Y 115/10* (2016.01)
*F21Y 113/00* (2016.01)

(52) U.S. Cl.
CPC .......... *F21V 19/001* (2013.01); *F21V 23/003* (2013.01); *G02B 6/0031* (2013.01); *G02B 6/0046* (2013.01); *F21Y 2105/12* (2016.08); *F21Y 2105/18* (2016.08); *F21Y 2113/00* (2013.01); *F21Y 2113/13* (2016.08); *F21Y 2115/10* (2016.08)

(58) Field of Classification Search
CPC ......... F21V 2200/20; F21Y 2113/10–2113/17; F21K 9/61
See application file for complete search history.

(56) References Cited

U.S. PATENT DOCUMENTS

| | | | |
|---|---|---|---|
| 9,544,968 B2 | 1/2017 | Matsubayashi et al. | |
| 2005/0057929 A1* | 3/2005 | Yano | F21K 9/00 362/240 |
| 2008/0285273 A1* | 11/2008 | Liu | F21S 6/003 362/240 |
| 2012/0134133 A1* | 5/2012 | Kang | F21V 3/00 362/84 |
| 2016/0076709 A1 | 3/2016 | Matsubayashi et al. | |
| 2017/0023214 A1* | 1/2017 | Cheng | H05K 1/00 |

FOREIGN PATENT DOCUMENTS

| | | | | |
|---|---|---|---|---|
| JP | 2003-237464 | 8/2003 | | |
| JP | 2005-302500 | 10/2005 | | |
| JP | 2012-022824 | 2/2012 | | |
| JP | 2013-125596 | 6/2013 | | |
| JP | 2014-075186 | 4/2014 | | |
| JP | 2014075186 A | * | 4/2014 | |
| JP | 2015-022944 | 2/2015 | | |
| WO | WO 2013182932 A1 | * | 12/2013 | F21V 3/00 |

OTHER PUBLICATIONS

U.S. Appl. No. 15/447,804 to Yoko Matsubayashi et al., filed Mar. 2, 2017.

U.S. Appl. No. 15/447,760 to Yoko Matsubayashi et al., filed Mar. 2, 2017.

* cited by examiner

LIGHTING APPARATUS WITH LOWER COLOR TEMPERATURE LIGHTING TO A PERIPHERAL REGION

CROSS REFERENCE TO RELATED APPLICATION

This application claims the benefit of priority of Japanese Patent Application Number 2016-041444 filed on Mar. 3, 2016, the entire content of which is hereby incorporated by reference.

BACKGROUND

1. Technical Field

The present disclosure relates to a lighting apparatus, and in particular to a lighting apparatus for correcting a change in visual performance due to aging.

2. Description of the Related Art

According to the arrival of an aging society, there has been a great demand for a comfortable environment for middle and older aged people. In particular, improvement in visual environment achieved by lighting is an urgent issue. It is thus necessary to clarify how lighting can correct a change in human visual system caused by aging. Examples of a change in visual performance due to aging mainly include (a) a fall in transmittance of a crystalline lens, in particular a fall in transmittance of a crystalline lens in a short wavelength range, and (b) a bleary eye (intraocular scattering) due to a cataract (a crystalline lens clouding over).

In order to address (a), lighting which increases a proportion of blue light that reaches a retina by intensifying light in a wavelength range where a transmittance of a crystalline lens falls, or in other words, by causing light to have a so-called high color temperature is recommended for middle and older aged people, as disclosed in Japanese Unexamined Patent Application Publication No. 2003-237464.

Furthermore, there is a method of intensifying blue light components in order to take also (b) into consideration, as disclosed in Japanese Unexamined Patent Application Publication No. H04-137305. Japanese Unexamined Patent Application Publication No. H04-137305 recommends lighting which reduces glare by mainly reducing light in a wavelength range (of 470 nm to 530 nm inclusive) which has strong influence on glare, and thus yields advantageous effects of allowing users to perceive high contrast, high lightness, and high color saturation.

Taking (b) into consideration, there is also a method of adjusting a color-variable wall in order to reduce intraocular scattering due to ambient light, as disclosed in Japanese Unexamined Patent Application Publication No. 2005-302500.

SUMMARY

When conducting visual work, middle and older aged people need high brightness, which is said to be 2 to 5 times as high as the brightness that younger aged people need. Accordingly, there has been a demand for a lighting apparatus for middle and older aged people which does not give glare, but gives light having high illuminance and makes colors appear highly vivid.

Accordingly, the present disclosure provides a lighting apparatus which prevents letters and objects that middle and older aged people view from appearing to have lower color saturation, while reducing glare that the middle and older aged people perceive.

A lighting apparatus according to an aspect of the present disclosure includes: a first light distributor which illuminates a predetermined region; and a second light distributor which illuminates a periphery of the predetermined region, wherein the first light distributor includes a first light emitting element having a spectral emission characteristic defined by a correlated color temperature of light being at least 5400 K and at most 7000 K, Duv being in a range of −6 to 5 inclusive, a chroma value calculated using a calculation method specified by the CIE 1997 Interim Color Appearance Model (Simple Version) being 2.7 or less, and a general color rendering index Ra being 80 or more, and the second light distributor includes a second light emitting element having a spectral emission characteristic defined by a correlated color temperature of light being lower than the correlated color temperature of the light emitted by the first light emitting element.

According to the present disclosure, letters and objects that middle and older aged people view are prevented from appearing to have lower color saturation, while reducing glare that the middle and older aged people perceive.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

The following specifically describes embodiments, with reference to the drawings. The embodiments described below each show a general or specific example. The numerical values, shapes, materials, elements, the arrangement and connection of the elements, and others indicated in the following exemplary embodiments are mere examples, and therefore are not intended to limit the present disclosure. Thus, among the elements in the following exemplary embodiments, elements not recited in any independent claim defining the most generic concept are described as arbitrary elements.

It should be noted that the drawings are schematic diagrams, and do not necessarily provide strictly accurate illustration.

[Entire Configuration]

The following describes a lighting apparatus according to an embodiment.

Figure 1:
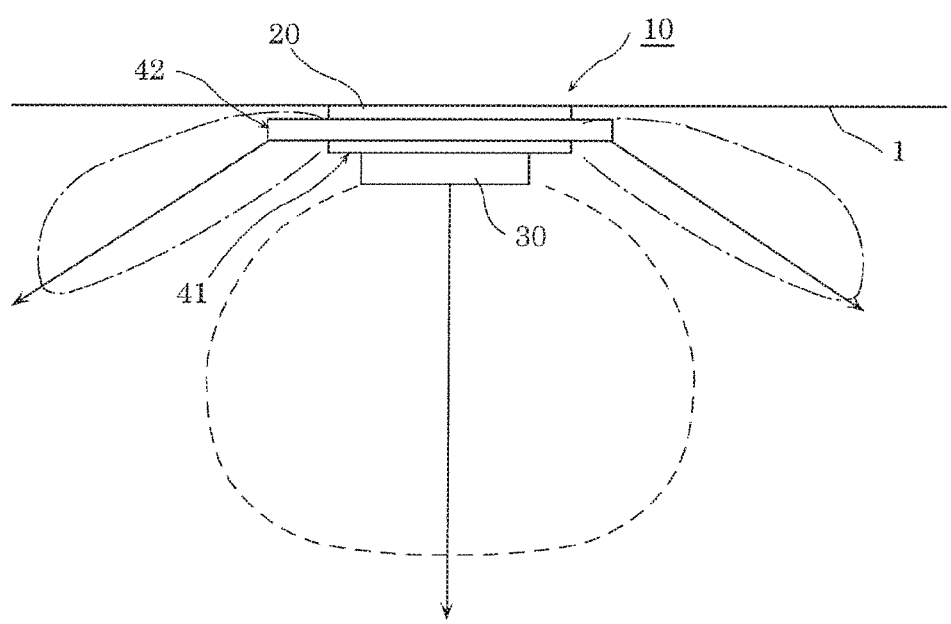
FIG. 1 is a side view illustrating a schematic structure of a lighting apparatus according to an embodiment.
Figure 2:
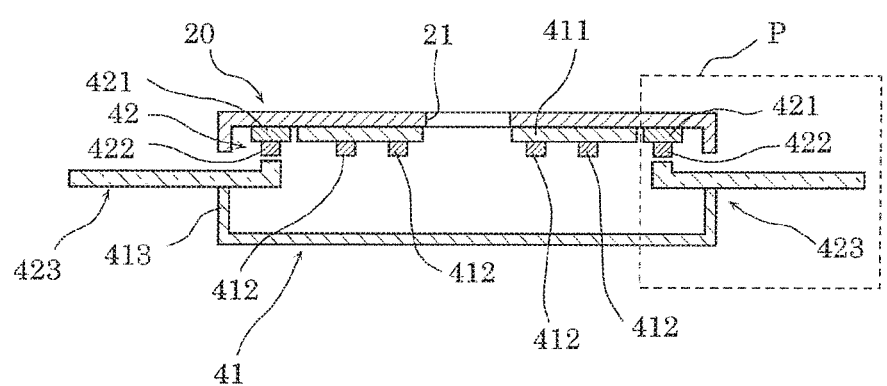
FIG. 2 is a cross-sectional view illustrating an internal structure of the lighting apparatus according to the embodiment.
Figure 3:
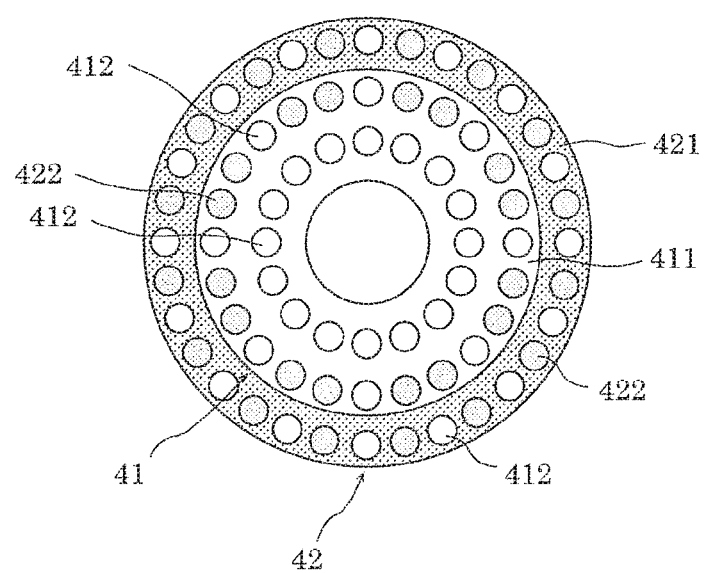
FIG. 3 is a schematic diagram illustrating arrangement of first light emitting elements and second light emitting elements included in the lighting apparatus according to the embodiment.

FIG. 1 is a side view illustrating a schematic structure of the lighting apparatus according to the embodiment. FIG. 2 is a cross-sectional view illustrating the internal structure of the lighting apparatus according to the embodiment. FIG. 3 is a schematic diagram illustrating arrangement of first light emitting elements and second light emitting elements included in the lighting apparatus according to the embodiment.

As illustrated in FIGS. 1 to 3, lighting apparatus 10 includes device body 20, first light distributor 41, and second light distributor 42. Lighting apparatus 10 is detachably attached to, for example, a hook ceiling body provided on ceiling 1 of a building.

Device body 20 is a casing for holding first light distributor 41 and second light distributor 42. Device body 20 is formed in a ring shape having circular opening 21 in the center portion. The hook ceiling body is electrically connected to first light distributor 41 and second light distributor 42 through opening 21.

Note that device body 20 is formed in the stated shape by performing press working on sheet metal such as an aluminum plate or a steel plate, for example. In order to increase reflexibility to improve light extraction efficiency, white coating is applied onto or a reflective metal material is vapor-deposited onto an inner surface (floor-side surface) of device body 20.

First light distributor 41 is a first light emitter for emitting white light, for example, and illuminates a region (predetermined region) directly under lighting apparatus 10. First light distributor 41 includes ring-shaped substrate 411, first light emitting elements 412 and second light emitting elements 422 mounted on a mounting surface (floor-side surface) of substrate 411, and cover 413 which diffuses light emitted by first light emitting elements 412.

Substrate 411 is a printed-circuit board for mounting first light emitting elements 412 and second light emitting elements 422. A wiring pattern (not illustrated) for mounting first light emitting elements 412 and second light emitting elements 422 is formed on substrate 411. The wring pattern is for supplying direct current from a circuit portion (including constant-power output circuit 11 and control circuit 12: see FIG. 5) to first light emitting elements 412 and second light emitting elements 422, by electrically connecting first light emitting elements 412 and second light emitting elements 422 to the circuit portion.

First light emitting elements 412 and second light emitting elements 422 are arranged on substrate 411 in double rings. First light emitting elements 412 and second light emitting elements 422 are, for example, packaged surface-mount white LED elements (SMDs: surface mount devices).

Cover 413 is an external cover for covering device body 20, and is detachably attached to device body 20. Cover 413 is formed of a light-transmissive resin material such as, for example, acrylics (PMMA), polycarbonate (PC), polyethylene terephthalate (PET), or polyvinyl chloride (PVC). Accordingly, light emitted by first light emitting elements 412 and second light emitting elements 422 included in first light distributor 41 toward the inner surface of cover 413 passes and exits through cover 413. Note that cover 413 may be given light diffusibility by forming cover 413 with a semi-opaque resin material. Light emitted by first light emitting elements 412 and second light emitting elements 422 included in first light distributor 41 passes through cover 413 to illuminate a region directly under lighting apparatus 10 (task region). In FIG. 1, the broken line indicates a light distribution pattern of first light distributor 41.

Second light distributor 42 is a second light emitter for emitting, for example, white light and illuminates the periphery of the region which first light distributor 42 illuminates. Second light distributor 42 includes ring-shaped substrate 421, first light emitting elements 412 and second light emitting elements 422 mounted on a mounting surface (floor-side surface) of substrate 421, and light guide 423 which controls distribution of light emitted by first light emitting elements 412 and second light emitting elements 422.

Substrate 421 has a principal surface parallel to substrate 411, and is surrounding substrate 411. Substrate 421 is a printed-circuit board for mounting first light emitting elements 412 and second light emitting elements 422 included in second light distributor 42. A wiring pattern (not illustrated) for mounting first light emitting elements 412 and second light emitting elements 422 is formed on substrate 421. The wiring pattern is for supplying direct current from the circuit portion (including constant-power output circuit 11 and control circuit 12: see FIG. 5) to first light emitting elements 412 and second light emitting elements 422, by electrically connecting first light emitting elements 412 and second light emitting elements 422 to the circuit portion.

The following describes in detail first light emitting elements 412 and second light emitting elements 422.

First light emitting elements 412 have a spectral emission property defined by a correlated color temperature of light being at least 5400 K and at most 7000 K, Duv being in a range of −6 to 5 inclusive, a chroma value calculated using a calculation method specified in the CIE 1997 Interim Color Appearance Model (Simple Version) being 2.7 or less, and general color rendering index Ra being 80 or more. Here, the chroma value is an index for quantitatively evaluating whitishness of an object to be viewed. Chromaticness is high when the chroma value is large, whereas chromaticness is low when the chroma value is small. Accordingly, when the chroma value is small, whitishness is high. Under the light having a spectrum which achieves the chroma value of 2.7 or less, the correlated color temperature of at least 5400 K and at most 7000 K, and color deviation Duv in a range of −6 to 5 inclusive, the readability of printed letters on a piece of paper is increased, which is already known (for example, Japanese Unexamined Patent Application Publication No. 2014-75186). Furthermore, general color rendering index Ra is an index for evaluating faithful reproducibility of a color, and JIS Z9112 "Classification of fluorescent lamps and light emitting diodes by chromaticity and colour rendering property" shows a criterion for the index. Specifically, general color rendering index Ra may be 80 or more. If combined light which is a combination of light emitted by first light emitting elements 412 and light emitted by second light emitting elements 422 has the above spectral emission property, a color can be faithfully reproduced while readability of letters printed on a piece of paper is increased.

Second light emitting elements 422 have a spectral emission property defined by a correlated color temperature of light being lower than a correlated color temperature of light emitted by first light emitting elements 412.

As illustrated in FIG. 3, first light emitting elements 412 and second light emitting elements 422 in first light distributor 41 are arranged on substrate 411 in double rings. Here, the inner ring is formed by 16 first light emitting elements 412. The outer ring is formed by 8 first light emitting elements 412 and 16 second light emitting elements 422. Specifically, sets of one first light emitting element 412 and two second light emitting elements 422 are repeated to form the outer ring.

With regard to the entirety of first light distributor 41, a proportion of the number of first light emitting elements 412 arranged (24) to the total number of first light emitting elements 412 and second light emitting elements 422 arranged (40) is 0.6.

In second light distributor 42, first light emitting elements 412 and second light emitting elements 422 are arranged on substrate 421 in a single ring. The single ring is formed by 16 first light emitting elements 412 and 16 second light emitting elements 422. Specifically, the single ring is formed by alternately arranging first light emitting elements 412 and second light emitting elements 422. With regard to second light distributor 42, a proportion of the number of arranged first light emitting element 412 (16) to the total number of arranged first light emitting elements 412 and second light emitting elements 422 (32) is 0.5.

Accordingly, first light distributor 41 has a higher proportion of the number of arranged first light emitting elements 412 to the total number of arranged first light emitting elements 412 and second light emitting elements 422 than second light distributor 42. In this manner, the color temperature of light from first light distributor 41 is higher than the color temperature of light from second light distributor 42.

First light distributor 41 has a greater total number of arranged first light emitting elements 412 and second light emitting elements 422 than second light distributor 42, and thus the illuminance of first light distributor 41 is higher than the illuminance of second light distributor 42.

The following describes light guide 423.

Figure 4:
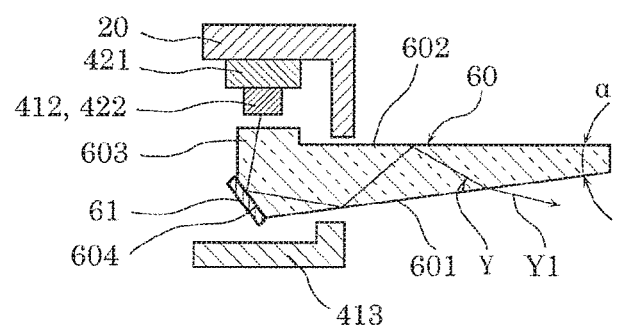
FIG. 4 is a cross-sectional view illustrating a portion of a light guide according to the embodiment.

FIG. 4 is a cross-sectional view illustrating a portion of light guide 423 according to the embodiment. Specifically, FIG. 4 is a cross-sectional view illustrating enlarged region P in FIG. 2.

Light guide 423 includes light guide member 60 and reflecting plate 61.

Light guide member 60 is a ring-shaped plate as a whole formed by a light-transmissive member made of, for instance, acrylic resin or epoxy resin, and bottom surface 601 (undersurface) of light guide member 60 forms a taper inclined upward to the outer edge. Protrusion 603 protruding upward is formed along the inner edge of upper surface 602 of light guide member 60, and first light emitting elements 412 and second light emitting elements 422 of second light distributor 42 face the upper surface of protrusion 603. Accordingly, light emitted by first light emitting elements 412 and second light emitting elements 422 of second light distributor 42 enters light guide member 60 through the upper surface of protrusion 603. In other words, the upper surface of protrusion 603 is a light-entering surface.

The perimeter of corner portion 604 where bottom surface 601 and the inner periphery of light guide member 60 join is chamfered. Reflecting plate 61 is attached to corner portion 604.

Reflecting plate 61 is a reflecting member such as, for example, a mirror which reflects light which has entered light guide member 60 toward the outer edge of light guide member 60.

An angle (slope angle) a between upper surface 602 and bottom surface 601 of light guide member 60 is set to a value which satisfies the inequality ($\alpha<(\theta+\gamma)/2$), where $\gamma$ denotes the angle at which light traveling inside light guide member 60 is incident upon the interface on the bottom surface 601 side, and $\theta$ denotes the critical angle of light guide member 60. Accordingly, the maximum exit angle of light totally reflected off the interface on the bottom surface 601 side among light reflected by reflecting plate 61 is less than 90 degrees, and thus the angle at which light exits through light guide member 60 can be maintained small. Thus, light can be distributed as indicated by arrow Y1 in FIG. 4. Hence, second light distributor 42 can illuminate the periphery (ambient region) of a region illuminated by first light distributor 41 (task region). Note that the dashed dotted line in FIG. 1 indicates the light distribution pattern of second light distributor 42.

Figure 5:
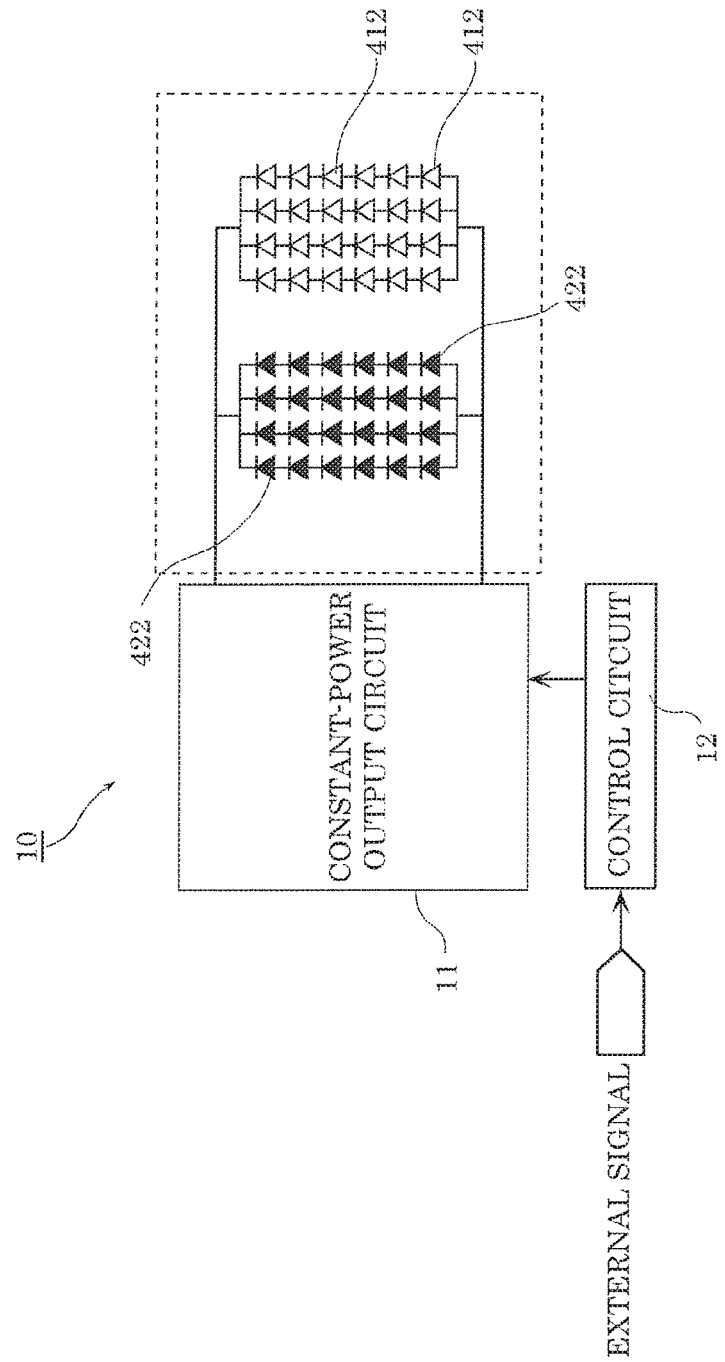
FIG. 5 is a block diagram illustrating a main control configuration of the lighting apparatus according to the embodiment.

FIG. 5 is a block diagram illustrating a main control configuration of lighting apparatus 10 according to the embodiment.

As illustrated in FIG. 5, lighting apparatus 10 includes constant-power output circuit 11 and control circuit 12.

Constant-power output circuit 11 is a circuit for supplying constant power to first light emitting elements 412 and second light emitting elements 422.

Control circuit 12 is a controller which separately controls outputs from first light emitting elements 412 and second light emitting elements 422, by controlling constant-power output circuit 11. Control circuit 12 controls constant-power output circuit 11 when an external signal for lighting is input by, for example, a light-on switch which is not illustrated being turned on, and controls light emission from first light emitting elements 412 and second light emitting elements 422.

First light emitting elements 412 are divided into a plurality of groups, and the groups of first light emitting elements 412 are electrically connected parallel to constant-power output circuit 11. Furthermore, first light emitting elements 412 in each group are electrically connected in series.

Similarly, second light emitting elements 422 are divided into a plurality of groups, and the groups of second light emitting elements 422 are electrically connected parallel to constant-power output circuit 11. Furthermore, second light emitting elements 422 in each group are electrically connected in series.

In this manner, control circuit 12 controls an output from first light distributor 41 according to an output from second light distributor 42, by controlling constant-power output circuit 11.

[Verification Experiment]

Next, a relation between illuminance and readability achieved by a light color is examined by experiment.

The experiment was based on subjective evaluation, and readability of letters printed on a piece of paper depending on the illuminance and a light color (correlated color temperature) was evaluated. The illuminance level is at least 300 lx and at most 1000 lx, and the color temperature is at least 2700 K and at most 7000 K, which is determined taking into consideration the chromaticity range of white light described in JISZ9112 "Classification of fluorescent lamps and light emitting diodes by chromaticity and colour rendering property."

An object to be viewed was typical plain copying paper. 30 letters cited from Mr. Oda's reading chart (MNRED-J) were printed in the center of a piece of paper in 7 pt which is the type size for newspaper, and the viewing distance was 400 mm. For illumination light, a liquid crystal filter was combined with a xenon lamp, and an apparatus which can emit various spectral light by controlling the liquid crystal filter was used. The color of illumination light was changed to four levels, namely 2700 K, 5000 K, 6000 K, and 7000 K, and the illuminance at the center of the piece of paper was changed to five levels, namely 300 lx, 500 lx, 600 lx, 750 lx, and 1000 lx. The subjects were 30 people including men and women, aged from 23 to 69.

As the procedure of the experiment, the four light colors were presented randomly. Only the illuminance was variable while maintaining the selected light color, and five levels of illuminance were presented in ascending order. First, a subject took three minutes to adapt to a piece of paper having no printed letters while such illumination light was emitted, and thereafter conducted a ten-second task (silently read the 30 letters printed on the piece of paper), and then made subjective evaluation. Subsequently, the subject took one minute to adapt to the piece of paper having no printed letters, conducted the ten-second task, and made subjective evaluation, which were repeated five times in total. Next, the light color was changed, and the experiment following the same procedure was repeated four times in total.

The subjective evaluation was based on seven ranks, and each subject selected "readability" of the printed letters from among "very easy to read," "quite easy to read," "slightly easy to read," "not easy, but not hard to read," "slightly hard to read." "quite hard to read," and "very hard to read."

Figure 6:
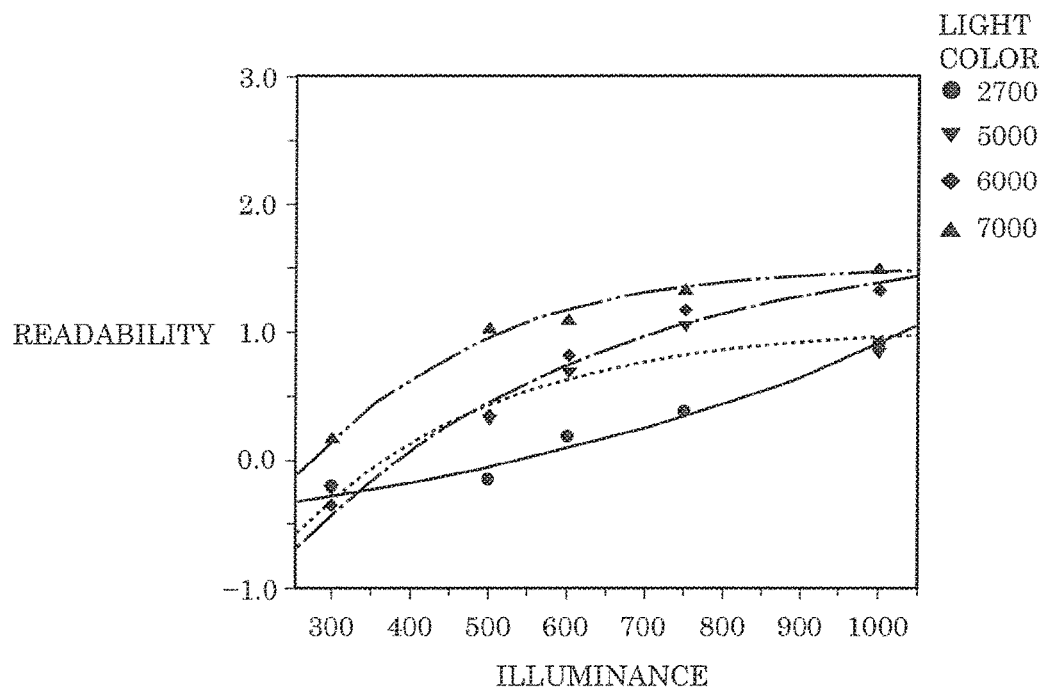
FIG. 6 is a graph illustrating evaluation results of subjects aged 50 and over obtained in a verification experiment.
Figure 7:
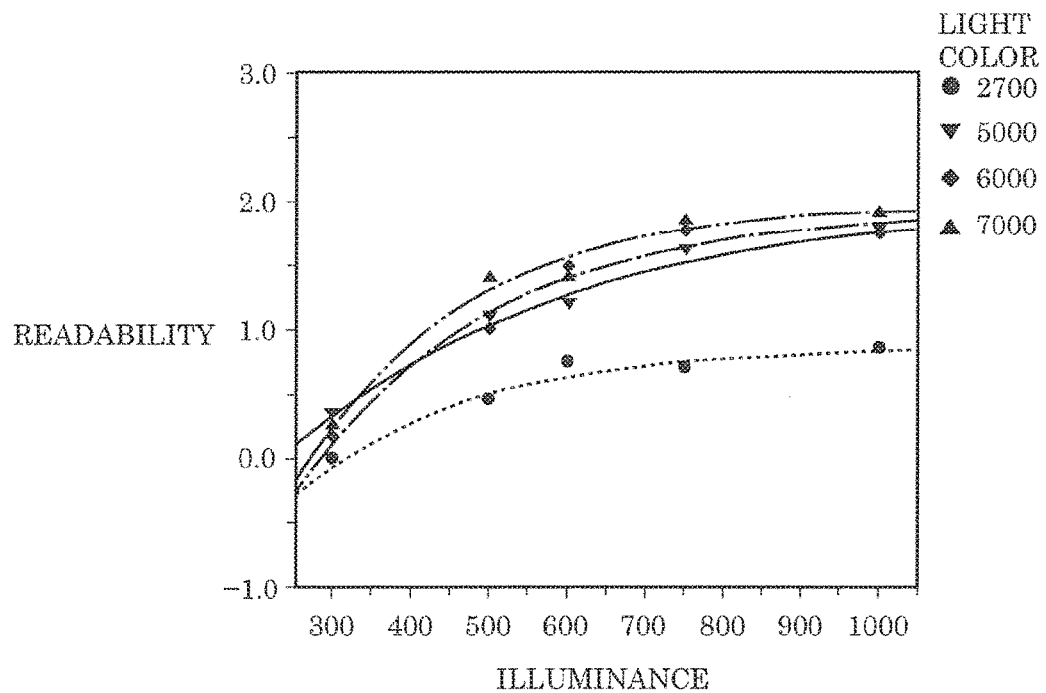
FIG. 7 is a graph illustrating evaluation results of subjects younger than 50 obtained in the verification experiment.

FIG. 6 is a graph illustrating results of evaluation by subjects aged 50 and over in the verification experiment, and FIG. 7 is a graph illustrating results of evaluation by subjects younger than 50 in the verification experiment.

The horizontal axes in FIGS. 6 and 7 indicate illuminance, whereas the vertical axes indicate evaluation values for readability which are plotted averages of 30 subjects. Note that the evaluation values for readability were 3, 2, 1, 0, −1, −2, −3 corresponding to "very easy to read," "quite easy to read," "slightly easy to read", "not easy, but not hard to read", "slightly hard to read", "quite hard to read", and "very hard to read", respectively, and obtained as arithmetic averages. As is clear from FIGS. 6 and 7, for both the group of subjects aged 50 and over and the group of subjects younger than 50, readability increases with illuminance, yet the rate of increase is different depending on a light color. In particular, readability at a high color temperature of 7000 K is higher than that at other color temperatures for the subjects aged 50 and over. This shows that a high color temperature renders letters more legible for middle and older aged people who are 50 and over. Thus, the light for the task region may have a higher color temperature than the light for the ambient region.

Experiment for "vividness" evaluation was conducted, in order to evaluate how colors appear to middle and older aged people.

For the experiment, three lighting conditions were employed (reference light: 5000 K (widely used), test 1 light: 6200 K (widely used), test 2 light: 6200 K (with high color rendering), illuminance of the reference light was changed to three levels (500 lx, 750 lx, 1000 lx), and subjects were ten in total, or more specifically, six subjects aged 45 to 65, both men and women (in middle age) and four subjects aged 25 to 44, both men and women (in maturing age). A ø120 downlight which emits the reference light and another ø120 downlight which emits test 1 or test 2 light were disposed in evaluation boxes (size: W300×D300×H500 [mm]/interior color: N7). The reference light evaluation box was disposed on the right, whereas the test evaluation box was disposed on the left, and paired comparison was made. Objects to be viewed were pieces of paper having JIS test colors (R9 red, R10 yellow, R11 green, R12 blue), and a 75-mm square window was provided in the center of a piece of N5 colored paper (lightness 5/gray). Then, a piece of JIS test colored paper was placed at the window. At this time, the viewing distance was 400 mm, and the angle at which a subject viewed test colored paper was 10.7 degrees.

The evaluation technique used was the method of limits. The illuminance of reference light was fixed, whereas the illuminance of test 1/test 2 light was variable. By paired comparison, a subject selected one evaluation box in which the test colored paper appeared more "vivid" (from among the reference light evaluation box and the test evaluation box) (two-point scale). The experiment was repeated three times each for an ascending series and a descending series.

As the procedure of the experiment, a subject took three minutes to adapt to the N5 colored paper in the reference light evaluation box, where no test colored paper was placed. After that, test colored paper was placed in each of the reference light evaluation box and the test evaluation box, while the illuminance of the reference light was fixed and the illuminance of test 1/test 2 light was adjusted. Specifically, when the illuminance of reference light was 500 lx, the illuminance of test 1/test 2 light was at least 150 lx and at most 520 lx. When the illuminance of reference light was 750 lx, the illuminance of test 1/test 2 light was at least 250 lx and at most 800 lx. When the illuminance of reference light was 1000 lx, the illuminance of test 1/test 2 light was at least 400 lx and at most 1060 lx. By paired comparison, the subject selected one evaluation box in which the test colored paper appeared more "vivid" (from among the reference light evaluation box and the test evaluation box). When the subject selected an evaluation box different from the one selected at the beginning, the evaluation for one series was terminated. Specifically, the evaluation was terminated when the subject selected the test evaluation box in the ascending series, and when the subject selected the reference light evaluation box in the descending series.

After conducting the experiment six times by alternating the experiment for the ascending series and the experiment for the descending series, the test colored paper was changed and four sets of the same experiment were repeatedly conducted.

After that, test 1 light and test 2 light were switched in the test evaluation box. The subject took one minute to adapt to the N5 colored paper, and thereafter test colored paper was placed. Then, the experiment was conducted six times by alternating the experiment for the ascending series and the experiment for the descending series, and thereafter the test colored paper was changed, and four sets of the same experiment were repeatedly conducted.

The subject compared the color paper in the evaluation box illuminated with the reference light having fixed illuminance (three levels: 500 lx, 750 lx, 1000 lx) and the color paper in the evaluation box illuminated with the test 1/test 2 light having variable illuminance. An average of six illuminance values of test light at which the evaluation box selected was changed to the other box (three illuminance values from the experiment for the ascending series, and three illuminance values from the experiment for the descending series) was used as a threshold.

Figure 8:
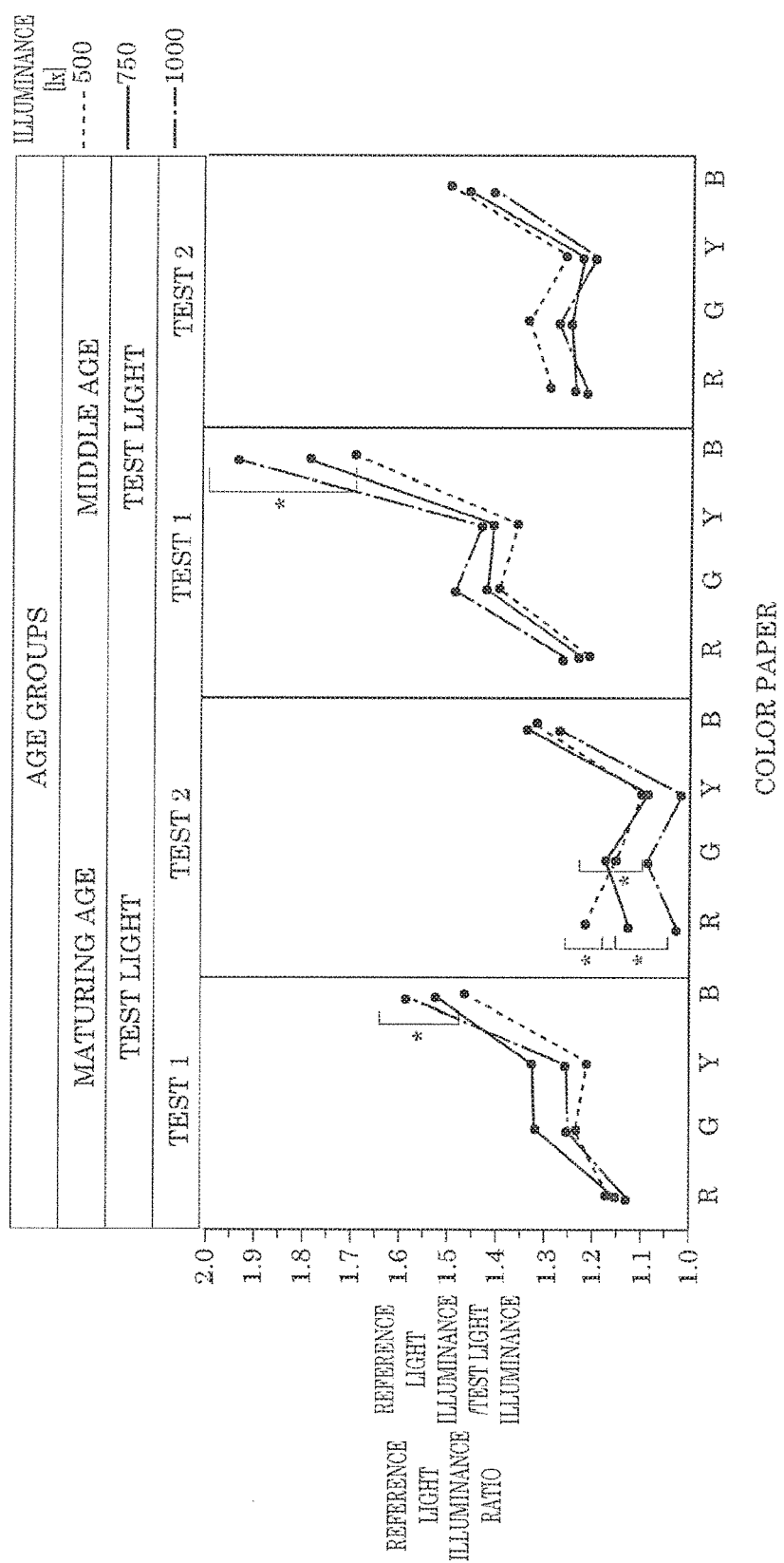
FIG. 8 is a graph illustrating results of calculating reference illuminance ratios used as thresholds in a verification experiment.

FIG. 8 is a graph illustrating results of calculating reference illuminance ratios used as thresholds in a verification experiment. Note that the reference illuminance ratio=reference light illuminance (500 lx, 750 lx, 1000 lx)/test light illuminance (threshold). The test 2 light is obtained by decreasing an intensity of test 1 light at a wavelength of at least 570 nm and at most 780 nm.

As illustrated in FIG. 8, compared to reference light having 5000 K, it can be seen that both the test 1 light and the test 2 light having a high color temperature yield effects of improvements in how the color appears, namely "vividness," and are particularly effective for middle aged subjects.

The test 2 light has almost the same reference light illuminance ratios for the colors (color paper), and a better color balance than the reference light having 5000 K. This greatly contributes to improvement in color appearance.

Here, in general, middle and older aged people tend to perceive glare than young people, and more strongly perceive glare when light has a higher color temperature.

From the above, although employing light having a high color temperature is effective in improving appearance of letters and colors which deteriorates due to aging, such light increases intraocular scattering, and thus people tend to perceive glare. Accordingly, it can be seen that increasing the illuminance, color temperature, and color rendering in a task region immediately under lighting apparatus 10 (region where visibility is to be secured) and decreasing the color temperature in a peripheral region (ambient region) are effective in improving visibility of middle and older aged people.

From the above, the correlated color temperature of light from first light distributor 41 which mainly illuminates the task region is set higher than the correlated color temperature of light from second light distributor 42 which mainly illuminates the ambient region, thus improving visibility of middle and older aged people.

Figure 9:
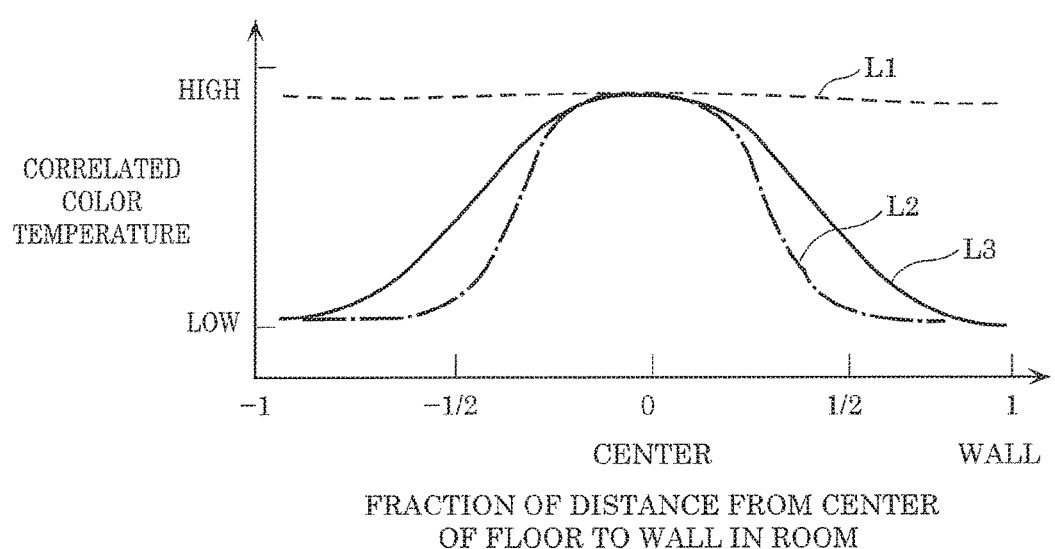
FIG. 9 is a graph illustrating a distribution of correlated color temperatures when the lighting apparatus according to the embodiment is installed in the center of a room.

FIG. 9 is a graph illustrating a distribution of correlated color temperatures when the lighting apparatus according to the embodiment is disposed in the center of a room. Here, the graph shows a distribution of correlated color temperatures of light which reaches points about 400 mm above the floor. The distance from the center to the wall of a substantially square room assumed to have a 12-mat size (about 20 m$^2$) is about 2.23 m. The horizontal axis in FIG. 9 indicates the fraction of the distance from the center to the wall, and thus "1" and "−1" indicate 2.23 m which is the distance from the center.

When light from first light distributor 41 and light from second light distributor 42 both have high color temperatures, the color temperature is substantially the same at any spots, as with typical ceiling light. A distribution of correlated color temperatures in such a case is indicated by dashed line L1 in FIG. 9.

For example, according to task ambient lighting disclosed in Japanese Unexamined Patent Application Publication No. 2015-022944, when light emitted to a task region has a high color temperature and light emitted to an ambient region has a low color temperature, the area irradiated with task illumination is narrow since the position of a light source that emits the task illumination is low. A distribution of correlated color temperatures in such a case is indicated by dashed dotted line L2 in FIG. 9. Accordingly, people tend to feel odd due to the colors of light, and a difference in color temperature may be maintained 2000 K or less, or even 1700 K or less.

In contrast, with lighting apparatus 10 according to the embodiment, first light distributor 41 and second light distributor 42 include first light emitting elements 412 and second light emitting elements 422 that are located near the ceiling, and thus the irradiation area of first light distributor 41 is large, which results in a distribution of correlated color temperatures as indicated by solid line L3. Further, the distribution of correlated color temperatures gradually changes.

Here, the lower a color temperature is, the higher the human sensitivity to a correlated color temperature is. Furthermore, even if differences in correlated color temperature are the same, the difference in correlated color temperature (light color) within a low color temperature range can be more readily distinguished. Accordingly, a gentle change in correlated color temperature contributes to a reduction in odd feeling at low color temperatures. Thus, visibility of middle and older aged people can be improved without giving odd feeling, by increasing the color temperature of light from first light distributor 41, and setting the color temperature of light from second light distributor 42 to a lower color temperature than that of first light distributor 41.

As described above, according to the present embodiment, lighting apparatus 10 includes: first light distributor 41; and second light distributor 42 which illuminates a periphery of a region illuminated by first light distributor 41. First light distributor 41 includes first light emitting element 412 having a spectral emission characteristic defined by a correlated color temperature of light being at least 5400 K and at most 7000 K, Duv being in a range of −6 to 5 inclusive, a chroma value calculated using a calculation method specified by the CIE 1997 Interim Color Appearance Model (Simple Version) being 2.7 or less, and a general color rendering index Ra being 80 or more. Second light distributor 42 includes second light emitting element 422 having a spectral emission characteristic defined by a correlated color temperature of light being lower than the correlated color temperature of the light emitted by first light emitting element 412.

According to this, first light distributor 41 which includes first light emitting element 412 can provide a high color temperature in a task region immediately under lighting apparatus 10, and second light distributor 42 which includes second light emitting element 422 can provide a low color temperature in the periphery (ambient region). Thus, the saturation of colors of letters and objects viewed can be prevented from appearing lower to middle and older aged people while preventing the middle and older aged people from perceiving glare.

Since first light emitting element 412 has a spectral emission property as stated above, it is possible to faithfully reproduce a color while increasing readability of letters printed on a piece of paper in the task region.

Lighting apparatus 10 further includes control circuit 12 which controls an output from first light distributor 41 according to an output from second light distributor 42.

Accordingly, control circuit 12 controls the output from first light distributor 41 according to the output from second light distributor 42, and thus the task illuminance can be changed according to the ambient illuminance. Light environment for middle and older aged people can be therefore achieved, which also handles differences in settings made by users.

An intensity of light from first light distributor 41 at a wavelength of at least 570 nm and at most 780 nm may be decreased. Specifically, light guide member 60 of first light distributor 41 may be formed by mixing an optical absorption material which absorbs light at a wavelength of at least 570 nm and at most 780 nm. This improves the color balance of light from first light distributor 41.

A correlated color temperature of light from first light distributor 41 is higher than a correlated color temperature of light from second light distributor 42.

Accordingly, the correlated color temperature of light from first light distributor 41 is higher than the correlated color temperature of light from second light distributor 42, and thus the task region can be reliably illuminated with light having a high color temperature, and the ambient region can be reliably illuminated with light having a low color temperature.

An illuminance of light from first light distributor 41 is higher than an illuminance of light from second light distributor 42.

Accordingly, the illuminance of light from first light distributor 41 is higher than the illuminance of light from second light distributor 42, and thus the task region can be illuminated more brightly than the ambient region, which improves workability.

Other Embodiments

The above has described the lighting apparatus according to the embodiment, yet the present disclosure is not limited to the above embodiment. Note that in the following description, the same element as that in the above embodiment may be given the same numeral, and a description of the element may be omitted.

For example, the above embodiment has described an example in which first light distributor 41 and second light distributor 42 include first light emitting elements 412 and second light emitting elements 422. However, an aspect in which first light distributor 41 includes only first light emitting elements 412, whereas second light distributor 42 includes only second light emitting elements 422 may also be adopted.

Furthermore, the above embodiment has given a description using an example in which substrate 421 included in second light distributor 42 is disposed parallel to substrate 411 included in first light distributor 41. However, regarding substrate 411 of first light distributor 41 and substrate 421 of second light distributor 42, any arrangement relation between substrates 411 and 421 may be adopted as long as substrate 421 is surrounding substrate 411.

Figure 10:
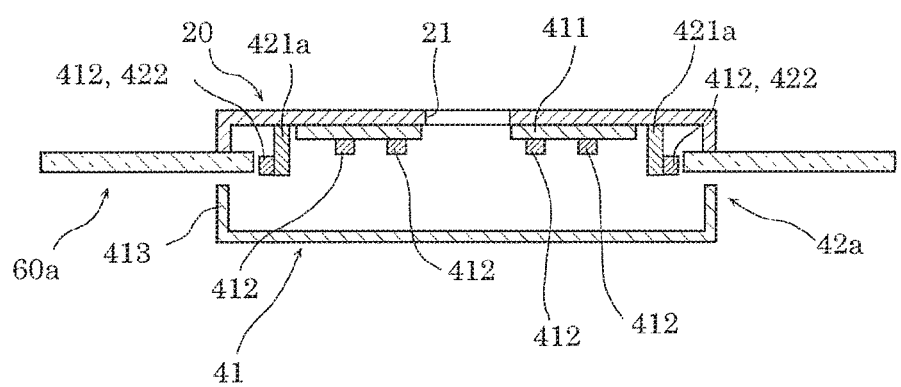
FIG. 10 is a cross-sectional view illustrating an internal structure of a lighting apparatus according to a variation.
Figure 11:
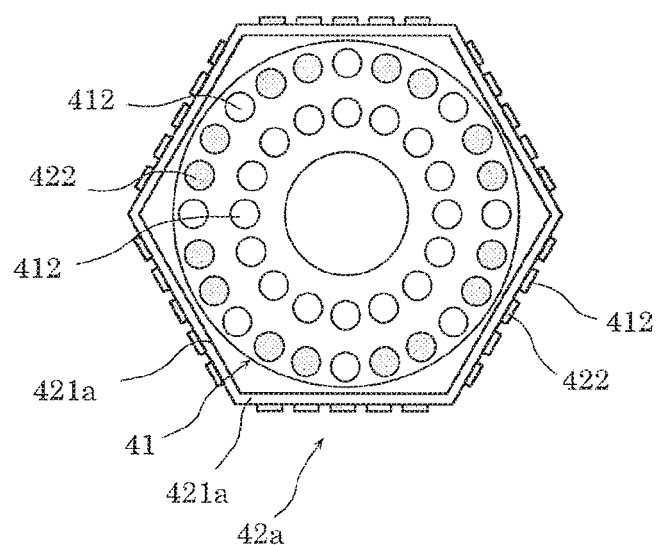
FIG. 11 is a schematic diagram illustrating arrangement of first light emitting elements and second light emitting elements included in the lighting apparatus according to the variation.

FIG. 10 is a cross-sectional view illustrating an internal structure of a lighting apparatus according to a variation. FIG. 11 is a schematic diagram illustrating the arrangement of first light emitting elements and second light emitting elements included in the lighting apparatus according to the variation.

As illustrated in FIGS. 10 and 11, substrate 421a of second light distributor 42 is protruding from device body 20 and surrounding substrate 411 of first light distributor 41. Substrate 421a of second light distributor 42 is protruding in a direction orthogonal to the principal surface of substrate 411 of first light distributor 41. As illustrated in FIG. 11, in plan view of substrate 411, substrate 421a of second light distributor 42 is disposed in a substantially hexagonal shape. The principal surface of substrate 421a facing outward is the mounting surface, and first light emitting elements 412 and second light emitting elements 422 are arranged on the principal surface in the circumferential direction. Two first light emitting elements 412 and three second light emitting elements 422 are alternately arranged along each side of the hexagon. In this manner, the direction of light emission by first light emitting elements 412 and second light emitting elements 422 included in second light distributor 42 is substantially horizontal.

Figure 12:
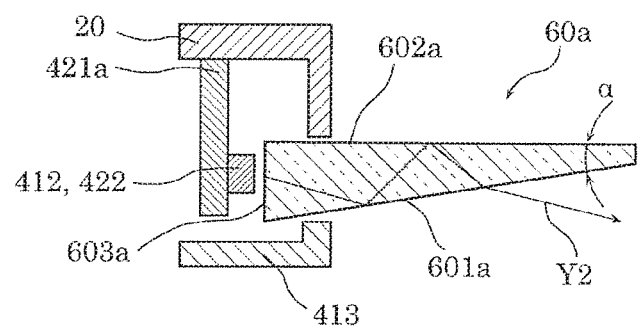
FIG. 12 is a cross-sectional view illustrating a portion of a light guide according to the variation.

FIG. 12 is a cross-sectional view illustrating a portion of a light guide according to the variation. Specifically, FIG. 12 corresponds to FIG. 4.

As illustrated in FIG. 12, light guide 60a is a light guide member formed using a light-transmissive member made of an acrylic resin or an epoxy resin, for instance. Light guide 60a is a ring-shaped plate as a whole, and bottom surface 601a (undersurface) of light guide 60a forms a taper inclined upward to the outer edge. First light emitting elements 412 and second light emitting elements 422 of second light distributor 42a face inner periphery 603a of light guide 60a. In this manner, light emitted by first light emitting elements 412 and second light emitting elements 422 of second light distributor 42a enters light guide 60a through inner periphery 603a.

Also in this case, angle $\alpha$ between upper surface 602a and bottom surface 601a of light guide member 60 is set to a value which satisfies the above-stated inequality. In this manner, the maximum exit angle of light totally reflected off the interface on the bottom surface 601a side is less than 90 degrees, and the angle at which light exits through light guide 60a can be maintained small. Accordingly, light can be distributed as illustrated in arrow Y2 in FIG. 12. From this, second light distributor 42a can illuminate the periphery (ambient region) of the region which first light distributor 41 illuminates (task region).

The first light distributor may include a plurality of the first light emitting element and a plurality of the second light emitting element, and the second light distributor may include a plurality of the first light emitting element and a plurality of the second light emitting element.

The plurality of the first light emitting element and the plurality of the second light emitting element of the first light distributor may be arranged in a double ring pattern.

An inner ring of the double ring pattern of the first light distributor may be formed only of the plurality of the first light emitting element.

An outer ring of the double ring pattern of the first light distributor may be formed of repeating sets of one of the plurality of the first light emitting element and two of the plurality of the second light emitting element.

The plurality of the first light emitting element and the plurality of the second light emitting element of the second light distributor may be arranged in a single ring pattern.

A proportion of a number of the plurality of the first light emitting element arranged in the first light distributor to a total number of the plurality of the first light emitting element and the plurality of the second light emitting element arranged in the first light distributor may be 0.6, and a proportion of a number of the plurality of the first light emitting element arranged in the second light distributor to a total number of the plurality of the first light emitting element and the plurality of the second light emitting element arranged in the second light distributor may be 0.5.

The first light distributor may have a higher proportion of a number of the plurality of the first light emitting element to a total number of the plurality of the first light emitting element and the plurality of the second light emitting element than the second light distributor, whereby a color temperature of light from the first light distributor is higher than a color temperature of light from the second light distributor.

The first light distributor may have a greater total number of the plurality of the first light emitting element and the plurality of the second light emitting element than the second light distributor, whereby an illuminance of the first light distributor is higher than an illuminance of the second light distributor.

The lighting apparatus may further include: a controller which controls an output from the first light distributor according to an output from the second light distributor, wherein the plurality of the first light emitting element included in the first light distributor and the plurality of the first light emitting element included in the second light distributor may be divided into a plurality of first groups, the plurality of first groups may be electrically connected to the controller in parallel, the plurality of the second light emitting element included in the first light distributor and the plurality of the second light emitting element included in the second light distributor may be divided into a plurality of second groups, and the plurality of second groups may be electrically connected to the controller in parallel.

First light emitting elements included in each of the plurality of first groups may be electrically connected in series, and second light emitting elements included in each of the plurality of second groups may be electrically connected in series.

The lighting apparatus may further include: a light guide which surrounds the second light distributor and includes a protruding portion and a tapered portion, an upper surface of the protruding portion facing the plurality of the first light emitting element and the plurality of the second light emitting element included in the second light distributor; and a reflecting plate disposed at a perimeter of a bottom surface of the protruding portion for reflecting light which has entered the light guide via the upper surface of the protruding portion toward the tapered portion.

A slope angle $\alpha$ between an upper surface of the tapered portion of the light guide and a bottom surface of the tapered portion of the light guide may satisfy the inequality of $\alpha<(\theta+\gamma)/2$, where $\gamma$ is an angle at which the light which has entered the light guide is incident upon the bottom surface of the tapered portion, and $\theta$ is a critical angle of the light guide.

The second light distributor may be parallel with the first light distributor.

The second light distributor may be orthogonal to the first light distributor.

A lighting apparatus may include: a first substrate being a printed-circuit board; a first light emitting element mounted on a mounting surface of the first substrate, the first light emitting element configured to illuminate a region directly under the lighting apparatus; a second substrate being a printed-circuit board; and a second light emitting element mounted on a mounting surface of the second substrate, the second light emitting element configured to illuminate a periphery of the region, wherein the first light emitting element may include a spectral emission characteristic defined by a correlated color temperature of light being at least 5400 K and at most 7000 K, Duv being in a range of −6 to 5 inclusive, a chroma value calculated using a calculation method specified by the CIE 1997 Interim Color Appearance Model (Simple Version) being 2.7 or less, and a general color rendering index Ra being 80 or more, and the second light emitting element may include a spectral emission characteristic defined by a correlated color temperature of light being lower than the correlated color temperature of the light emitted by the first light emitting element.

Note that aspects obtained by arbitrarily combining the configurations described in the above embodiment and the variation also fall within the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:
1. A lighting apparatus comprising:
a first light distributor which illuminates a predetermined region; and
a second light distributor which illuminates a periphery of the predetermined region, wherein
the first light distributor includes a first light emitting element having a spectral emission characteristic defined by a correlated color temperature of light being at least 5400 K and at most 7000 K, Duv being in a range of −6 to 5 inclusive, a chroma value calculated using a calculation method specified by the CIE 1997 Interim Color Appearance Model (Simple Version) being 2.7 or less, and a general color rendering index Ra being 80 or more,
the second light distributor includes a second light emitting element having a spectral emission characteristic defined by a correlated color temperature of light being lower than the correlated color temperature of the light emitted by the first light emitting element,
the first light distributor includes a plurality of the first light emitting element and a plurality of the second light emitting element,
the second light distributor includes a plurality of the first light emitting element and a plurality of the second light emitting element,
the plurality of the first light emitting element and the plurality of the second light emitting element of the first light distributor are arranged in a double ring pattern, and
an inner ring of the double ring pattern of the first light distributor is formed only of the plurality of the first light emitting element.
2. The lighting apparatus according to claim 1, further comprising
a controller which controls an output from the first light distributor according to an output from the second light distributor.
3. The lighting apparatus according to claim 1, wherein
the first light distributor includes an element that is configured to decrease an intensity of light emitted from the first light distributor in a wavelength of at least 570 nm and at most 780 nm.
4. The lighting apparatus according to claim 1, wherein
a correlated color temperature of light from the first light distributor is higher than a correlated color temperature of light from the second light distributor.
5. The lighting apparatus according to claim 1, wherein
an illuminance of light from the first light distributor is higher than an illuminance of light from the second light distributor.

6. The lighting apparatus according to claim 1, wherein an outer ring of the double ring pattern of the first light distributor is formed of repeating sets of one of the plurality of the first light emitting element and two of the plurality of the second light emitting element.

7. The lighting apparatus according to claim 6, wherein the plurality of the first light emitting element and the plurality of the second light emitting element of the second light distributor are arranged in a single ring pattern.

8. The lighting apparatus according to claim 1, wherein a proportion of a number of the plurality of the first light emitting element arranged in the first light distributor to a total number of the plurality of the first light emitting element and the plurality of the second light emitting element arranged in the first light distributor is 0.6, and a proportion of a number of the plurality of the first light emitting element arranged in the second light distributor to a total number of the plurality of the first light emitting element and the plurality of the second light emitting element arranged in the second light distributor is 0.5.

9. The lighting apparatus according to claim 1, wherein the first light distributor has a higher proportion of a number of the plurality of the first light emitting element to a total number of the plurality of the first light emitting element and the plurality of the second light emitting element than the second light distributor, whereby a color temperature of light from the first light distributor is higher than a color temperature of light from the second light distributor.

10. The lighting apparatus according to claim 1, wherein the first light distributor has a greater total number of the plurality of the first light emitting element and the plurality of the second light emitting element than the second light distributor, whereby an illuminance of the first light distributor is higher than an illuminance of the second light distributor.

11. The lighting apparatus according to claim 1, further comprising:

a controller which controls an output from the first light distributor according to an output from the second light distributor, wherein the plurality of the first light emitting element included in the first light distributor and the plurality of the first light emitting element included in the second light distributor are divided into a plurality of first groups, the plurality of first groups are electrically connected to the controller in parallel, the plurality of the second light emitting element included in the first light distributor and the plurality of the second light emitting element included in the second light distributor are divided into a plurality of second groups, and the plurality of second groups are electrically connected to the controller in parallel.

12. The lighting apparatus according to claim 11, wherein first light emitting elements included in each of the plurality of first groups are electrically connected in series, and second light emitting elements included in each of the plurality of second groups are electrically connected in series.

13. The lighting apparatus according to claim 1, further comprising:

a light guide which surrounds the second light distributor and includes a protruding portion and a tapered portion, an upper surface of the protruding portion facing the plurality of the first light emitting element and the plurality of the second light emitting element included in the second light distributor; and a reflecting plate disposed at a perimeter of a bottom surface of the protruding portion for reflecting light which has entered the light guide via the upper surface of the protruding portion toward the tapered portion.

14. The lighting apparatus according to claim 13, wherein a slope angle $\alpha$ between an upper surface of the tapered portion of the light guide and a bottom surface of the tapered portion of the light guide satisfies the inequality of $\alpha<(\theta+\gamma)/2$, where $\gamma$ is an angle at which the light which has entered the light guide is incident upon the bottom surface of the tapered portion, and $\theta$ is a critical angle of the light guide.

15. The lighting apparatus according to claim 1, wherein a mounting surface of the second light distributor, on which the plurality of the first light emitting element and the plurality of the second light emitting element of the second light distributor are disposed, is parallel with a mounting surface of the first light distributor, on which the plurality of the first light emitting element and the plurality of the second light emitting element of the first light distributor are disposed.

16. The lighting apparatus according to claim 1, wherein a mounting surface of the second light distributor, on which the plurality of the first light emitting element and the plurality of the second light emitting element of the second light distributor are disposed, is orthogonal to a mounting surface of the first light distributor, on which the plurality of the first light emitting element and the plurality of the second light emitting element of the first light distributor are disposed.

17. A lighting apparatus, comprising:

a first substrate being a printed-circuit board;

a first light distributor configured to illuminate a region directly under the lighting apparatus;

a second substrate being a printed-circuit board;

a second light distributor configured to illuminate a periphery of the region;

a first light emitting element that includes a spectral emission characteristic defined by a correlated color temperature of light being at least 5400 K and at most 7000 K, Duv being in a range of 6 to 5 inclusive, a chroma value calculated using a calculation method specified by the CIE 1997 Interim Color Appearance Model (Simple Version) being 2.7 or less, and a general color rendering index Ra being 80 or more; and a second light emitting element that includes a spectral emission characteristic defined by a correlated color temperature of light being lower than the correlated color temperature of the light emitted by the first light emitting element, wherein the first light distributor includes the first substrate, a plurality of the first light emitting element mounted on a mounting surface of the first substrate, and a plurality of the second light emitting element mounted on the mounting surface of the first substrate, the second light distributor includes the second substrate, a plurality of the first light emitting element mounted on a mounting surface of the second substrate, and a plurality of the second light emitting element mounted on the mounting surface of the second substrate, the plurality of the first light emitting element and the plurality of the second light emitting element of the first light distributor are arranged in a double ring pattern on the mounting surface of the first substrate, and an inner ring of the double ring pattern of the first light distributor is formed only of the plurality of the first light emitting element.

18. A lighting apparatus comprising:

a first light distributor which illuminates a predetermined region; and a second light distributor which illuminates a periphery of the predetermined region, wherein the first light distributor includes a first light emitting element having a spectral emission characteristic defined by a correlated color temperature of light being at least 5400 K and at most 7000 K, Duv being in a range of −6 to 5 inclusive, a chroma value calculated using a calculation method specified by the CIE 1997 Interim Color Appearance Model (Simple Version) being 2.7 or less, and a general color rendering index Ra being 80 or more, the second light distributor includes a second light emitting element having a spectral emission characteristic defined by a correlated color temperature of light being lower than the correlated color temperature of the light emitted by the first light emitting element, the first light distributor includes a plurality of the first light emitting element and a plurality of the second light emitting element, the second light distributor includes a plurality of the first light emitting element and a plurality of the second light emitting element, a proportion of a number of the plurality of the first light emitting element arranged in the first light distributor to a total number of the plurality of the first light emitting element and the plurality of the second light emitting element arranged in the first light distributor is 0.6, and a proportion of a number of the plurality of the first light emitting element arranged in the second light distributor to a total number of the plurality of the first light emitting element and the plurality of the second light emitting element arranged in the second light distributor is 0.5.

* * * * *